June 21, 1949.　　　G. V. JAKEWAY　　　2,473,648
CONTROL KNOB OF THERMOPLASTIC MATERIAL
Filed Nov. 29, 1945
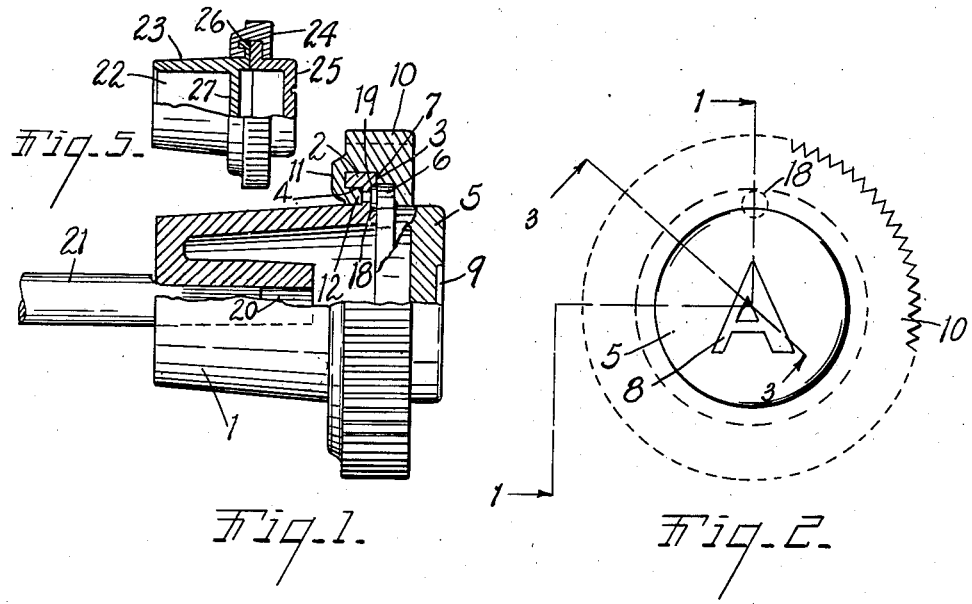
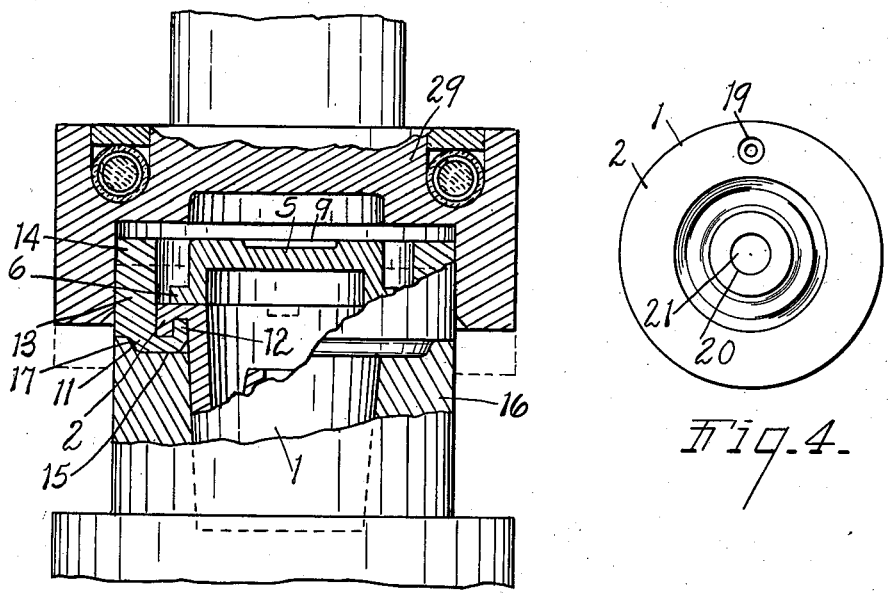
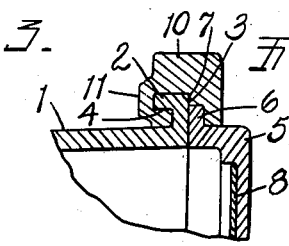
INVENTOR.
Gerald V. Jakeway
BY
Earl & Chappell
ATTORNEYS.

Patented June 21, 1949

2,473,648

UNITED STATES PATENT OFFICE 2,473,648

CONTROL KNOB OF THERMOPLASTIC MATERIAL

Gerald V. Jakeway, Grand Rapids, Mich., assignor to Keeler Brass Company, Grand Rapids, Mich., a corporation of Michigan Application November 29, 1945, Serial No. 631,614

7 Claims. (Cl. 74—553)

This invention relates to improvements in control knob of thermoplastic material.

The main objects of this invention are:

First, to provide a knob which is well adapted for use as a control element knob such, for example, as in chokes, light switches and the like.

Second, to provide a knob formed of thermoplastic material which is ornamental in character and which may embody desired characters or indicia.

Third, to provide a knob structure which while formed of relatively light stock or has incorporated therein a relatively small mass of material, is strong and rigid.

Fourth, to provide a method of manufacturing knobs which results in a very economical production thereof.

Objects relating to details and economies of the invention will appear from the description to follow. The invention is defined and pointed out in the claims.

Preferred embodiments of the invention are illustrated in the accompanying drawing, in which:

Fig. 1 is a fragmentary view partially in section on a line corresponding to line 1—1 of Fig. 2 of a knob embodying my invention.

Fig. 2 is a front end or face view, parts being shown by dotted lines.

Fig. 3 is a fragmentary view of an apparatus illustrating certain steps in practising the method of my invention or which may be used in the manufacture of knobs embodying my invention.

Fig. 4 is an end view of the body member.

Fig. 5 is a fragmentary view partially in longitudinal section corresponding to that of Fig. 1 of a slightly modified form or embodiment of my invention.

Fig. 6 is a fragmentary view illustrating a further modification or embodiment of my invention in which the indicia is arranged on the inner side of a transparent cap element.

The embodiment of my invention illustrated in Figs. 1 to 4 inclusive comprises a body member 1 formed of molded thermoplastic material, the body member having an external flange 2 at its outer end, the outer side 3 of the flange being flush with the end of the body member. This flange has a rearwardly facing groove 4 in the inner side thereof, this groove being of substantial width and depth, the side of the body member constituting the inner wall of the groove.

The cap member 5 is also of molded thermoplastic material and is formed with an external peripheral flange 6 at its inner end. This flange 6 is of less radial width than the flange of the body member thereby exposing a portion 7 of the flange of the body member. The cap may be provided with indicia such as is indicated at 8 in the form of a recess 9 suitably coated or, as shown in Fig. 6, the indicia 8 may be on the inner side of the top of the cap, the cap being transparent to expose the indicia.

The body and cap members are connected by means of the combined grip and coupling member 10 which is formed of thermoplastic material and is of such internal diameter as to closely embrace the periphery of the flange of the body member. This coupling member has an inturned flange 11 at its inner end having interlocking engagement with the groove in the inner side of the body member flange, the inner edge 12 of the flange 11 fitting into the groove and fittingly embracing the side of the body member.

The outer end of the coupling member is in upset engagement with the outer side of the flange 6 on the cap member and also the surface 7 of the body member extending beyond the cap member. This is desirably accomplished by the method of my invention, the steps of which are illustrated in Fig. 3.

In practicing the method I form the blank 13 of the coupling member of thermoplastic material and with a cylindrical side or wall portion 14 of substantial thickness and length, the flange 11 being formed in the blank substantially as in the completed article. This member 14 is arranged on an annular seat 15 provided therefor on the die member 16, the seat being shouldered to engage the annular recess 17 in the coupling member. The body member 1 is then dropped into the die member 16 with its flange in interlocking engagement with the flange of the coupling member. The cap member 5 is then arranged on the flange of the body member, being desirably provided with a lug 18 which engages a hole 19 in the flange of the body member, thus properly locating the indicia where the knob is to be engaged with a stem in a particular relation. The outer end portion of the coupling member blank is then plasticized desirably by means of the heated die member 29 and the die member actuated to upset the coupling member to embracing clamping relation to the parts as has been described. This forms a very rigid strong structure and when formed of thermoplastic material may be produced in a wide variety of colors.

The body member shown in Figs. 1 and 3 is formed with a socket 20 for the spindle 21, this being a non-circular socket to engage the non-circular spindle so that the indicia is properly positioned on the spindle.

In the embodiment shown in Fig. 5 the socket 22 of the body member 23 is designed for larger spindles or smaller knobs relative to the spindle. In this embodiment, the flange 24 of the cap 25 extends to the outer edge of the flange 26 of the body member 23. The parts are secured together in the same relation. In this embodiment, the inner end of the socket is closed by a wall 27.

While it is for many uses desirable to form the body member, cap and coupling and grip member of thermoplastic material, the body member and cap may be formed of metal and shaped substantially as illustrated and described and connected by the thermoplastic coupling member.

Structures embodying my invention are capable of a very wide adaptation in use and also in the matter of design and while the structure illustrated is primarily designed for use in motor vehicles, knobs embodying my invention are adapted for many other uses such as furniture and the like.

I have illustrated and described my invention in forms which I believe will enable those skilled in the art to embody or adapt my invention and to practice the method of my invention in the many adaptations thereof contemplated by me.

Having thus described my invention, what I claim as new and desire to secure by Letters Patent is:

1. A knob comprising a thermoplastic body member of premolded thermoplastic material provided with a spindle socket and an external peripheral flange at its outer end, the outer side of the flange being flush with the end of the body member, the flange having an annular rearwardly facing groove of substantial width and depth in its inner side, a cap of premolded thermoplastic material having an external peripheral flange at its inner end arranged on said body member in abutting relation thereto and with its flange overlapping and abutting the flange of said body member but being of less radial diameter than the radial diameter of the flange on the body member, and an annular coupling and grip member of thermoplastic material closely embracing the flange on said body member and having a flange at its inner end in interlocking engagement with the rearwardly facing groove on the flange of the body member and closely embracing the side of the body member constituting the inner wall of the groove, the outer end of the coupling member being in upset engagement with the top and periphery of the cap member flange and the outer side of the body member flange which projects beyond the flange of the cap member and in closely embracing relation to the side of the cap member.

2. A knob comprising a thermoplastic body member of premolded thermoplastic material provided with a spindle socket and an external peripheral flange at its outer end, the flange having an annular rearwardly facing groove in its inner side, a cap of premolded thermoplastic material having an external peripheral flange at its inner end arranged on said body member in abutting relation thereto and with its flange overlapping and abutting the flange of said body member but being of less radial diameter than the radial diameter of the flange on the body member, and an annular coupling and grip member of thermoplastic material closely embracing the flange on said body member and having a flange at its inner end in interlocking engagement with the rearwardly facing groove on the flange of the body member, the outer end of the coupling member being in engagement with the top of the cap member flange and in closely embracing relation to the side of the cap member.

3. A knob comprising a body member provided with a spindle socket and an external peripheral flange at its outer end, the flange having an annular rearwardly facing groove in its inner side, a cap having an external peripheral flange at its inner end arranged on said body member in abutting relation thereto and with its flange overlapping and abutting the flange of said body member but being of less radial diameter than the radial diameter of the flange on the body member, and an annular coupling and grip member of thermoplastic material closely embracing the flange on said body member and having an inturned flange at its inner end in engagement with the rearwardly facing groove on the flange of the body member and closely embracing the side of the body member constituting the inner wall of the groove, the outer end of the coupling member being in engagement with the top of the cap member flange and in closely embracing relation to the side of the cap member.

4. A knob comprising a body member provided with a spindle socket and external peripheral flange at its outer end, the flange having an annular rearwardly facing groove in its inner side, a cap having an external peripheral flange at its inner end arranged on said body member in abutting relation thereto and with its flange overlapping and abutting the flange of said body member, and an annular coupling and grip member of thermoplastic material closely embracing the flange on said body member and having an inturned flange at its inner end in engagement with the rearwardly facing groove on the flange of the body member, the outer end of the coupling member being in engagement with the top of the cap member flange.

5. A knob comprising a thermoplastic body member of premolded thermoplastic material having an external peripheral flange at its outer end, the flange having an annular rearwardly facing groove in its inner side, a cap of premolded thermoplastic material having an external peripheral flange at its inner end arranged on said body member in abutting relation thereto and with its flange overlapping and abutting the flange of said body, and an annular coupling of thermoplastic material embracing the flange on said body member and having an inturned flange at its inner end in interlocking engagement with the rearwardly facing groove on the flange of the body member, the outer end of the grip being in clamping engagement with the cap member flange.

6. A knob comprising a body member having an external peripheral flange at its outer end, the flange having an annular rearwardly facing groove in its inner side, a cap having an external peripheral flange at its inner end arranged on said body member in abutting relation thereto and with its flange overlapping and abutting the flange of said body, and an annular coupling of thermoplastic material embracing the flange on said body member and having an inturned flange at its inner end in interlocking engagement with the rearwardly facing groove on the flange of the body member, the outer end of the coupling member being in clamping engagement with the cap member flange, the periphery of said coupling member being serrated to form a grip surface.

7. A knob comprising a body member having an external flange at its outer end, the flange having an annular rearwardly facing groove in its inner side, a cap having an external peripheral flange at its inner end arranged on said body member in abutting relation thereto and with its flange overlapping and abutting the flange of said body, and an annular coupling embracing the flange on said body member and having an inturned flange at its inner end in interlocking engagement with the rearwardly facing groove on the flange of the body member, the outer end of the coupling member being in clamping engagement with the cap member flange, the periphery of said coupling member being serrated to form a grip surface.

GERALD V. JAKEWAY.

REFERENCES CITED

The following references are of record in the file of this patent:

UNITED STATES PATENTS

| Number | Name | Date |
|---|---|---|
| 470,919 | Rogers | Mar. 15, 1892 |
| 1,086,200 | Michie | Feb. 3, 1914 |
| 1,529,517 | Tilton | Mar. 10, 1925 |
| 1,563,351 | Field, et al. | Dec. 1, 1925 |
| 2,211,102 | Davis | Aug. 13, 1940 |
| 2,342,403 | Jakeway | Feb. 22, 1944 |
| 2,386,498 | Ostrander | Oct. 9, 1945 |